United States Patent
Bandolini et al.

(10) Patent No.: US 6,872,756 B2
(45) Date of Patent: Mar. 29, 2005

(54) FOAM COMPRISING ETHYLENE/VINYL ACETATE COPOLYMER

(75) Inventors: Maurizio Bandolini, Milan (IT); Shau T. Lee, Oakland, NJ (US); Natarajan S. Ramesh, Grapevine, TX (US); James J. Baker, Scotia, NY (US)

(73) Assignee: Sealed Air Corporation (US), Saddle Brook, NJ (US)

( * ) Notice: Subject to any disclaimer, the term of this patent is extended or adjusted under 35 U.S.C. 154(b) by 0 days.

(21) Appl. No.: 10/396,903

(22) Filed: Mar. 25, 2003

(65) Prior Publication Data

US 2003/0220412 A1 Nov. 27, 2003

Related U.S. Application Data

(63) Continuation-in-part of application No. 10/113,989, filed on Apr. 1, 2002, now abandoned.

(51) Int. Cl.$^7$ ................................................. C08J 9/00
(52) U.S. Cl. ........................ 521/97; 521/79; 521/143; 521/149
(58) Field of Search ........................... 521/97, 79, 143, 521/149, 134

(56) References Cited

U.S. PATENT DOCUMENTS

| | | | |
|---|---|---|---|
| 4,129,530 A | 12/1978 | Park et al. | |
| 4,331,779 A | 5/1982 | Park | |
| 4,368,276 A | 1/1983 | Park | 521/79 |
| RE31,744 E | 11/1984 | Watanabe et al. | |
| 4,640,933 A | 2/1987 | Park | 521/94 |
| 4,666,947 A | 5/1987 | Brichta et al. | |
| 4,738,810 A | 4/1988 | Chen-Shiang | 264/54 |
| 4,931,484 A | 6/1990 | Hovis et al. | |
| 4,946,871 A | 8/1990 | Brichta et al. | |
| 5,428,093 A | 6/1995 | Lee | 524/317 |
| 5,462,974 A | 10/1995 | Lee | 521/79 |
| 5,667,728 A | 9/1997 | Lee | 252/350 |
| 5,882,776 A | 3/1999 | Bambara et al. | 428/215 |
| 5,895,614 A | 4/1999 | Rivera et al. | |
| 5,938,878 A | 8/1999 | Hurley et al. | 156/219 |
| 6,096,793 A | 8/2000 | Lee et al. | 521/134 |
| 6,160,029 A | 12/2000 | Chaudhary et al. | 521/139 |

OTHER PUBLICATIONS

"Exxon Mobil LD 307 Ethylene Vinyl Acetate Copolymer for Clear, High Impact Film", Exxon Mobil Chemical (Internet Oct. 20, 1999).

"Exxon Mobil LD 312 Ethylene Vinyl Acetate Copolymer for High Impact Film", Exxon Mobil Chemical (Internet Oct. 21, 1999).

"Escorene™ Ultra LD 725 Ethylene Vinyl Acetate Copolymer for Compounding", Exxon Mobil Chemical (Internet Oct. 19, 1999).

"Escorene™ Ultra LD 728 Ethylene Vinyl Acetate Copolymer for Specialty Applications", Exxon Mobil Chemical (Internet Oct. 19, 1999).

"Escorene ™ Ultra LD 730 Ethylene Vinyl Acetate Copolymer for Extrusion and Foam Applications", Exxon Mobile Chemical (Internet Oct. 19, 1999).

"Escorene™ Ultra LD 768 Ethylene Vinyl Acetate Copolymer for Compounding", Exxon Mobile Chemical (Internet Oct. 19, 1999).

*Primary Examiner*—Morton Foelak
(74) *Attorney, Agent, or Firm*—Thomas C. Lagaly

(57) ABSTRACT

A foam formed from ethylene/vinyl acetate copolymer having a melt index of greater than 1 gram/10 minutes and a vinyl acetate content ranging from about 5 to about 25 weight percent.

16 Claims, No Drawings

FOAM COMPRISING ETHYLENE/VINYL ACETATE COPOLYMER

This Application is a Continuation-in-Part of U.S. Ser. No. 10/113,989, filed Apr. 1, 2002, now abandoned.

BACKGROUND OF THE INVENTION

The present invention relates generally to polyolefin foams and, more particularly, to extruded foam sheets comprising ethylene/vinyl acetate copolymer.

Polyolefin foams, particularly polyethylene foams, and methods for manufacturing such foams are well known in the art. See, e.g., U.S. Pat. No. 5,348,984 (Lee), U.S. Pat. No. 5,462,974 (Lee), and U.S. Pat. No. 5,667,728 (Lee), the disclosures of which are incorporated herein by reference thereto. One of the most common polyethylenes used is low density polyethylene (LDPE).

While LDPE possesses a number of beneficial physical and chemical properties when used to produce a foamed sheet, a disadvantage of LDPE is that foams made therefrom generally have a lower surface coefficient of friction (COF) than would otherwise be desired for certain applications, including 'blocking-and-bracing,' load-bearing, and other protective packaging applications. LDPE foam is advantageously used in protective packaging applications due to its shock-absorbing characteristics, which allow the foam to absorb impacts that would otherwise be transmitted directly to the packaged object. When used for such purposes, the foam is placed in contact with the packaged object and positioned between the object and a shipping pallet or shipping crate on or in which the item is transported. In order to adequately protect the object, it is necessary to minimize relative movement between the object and the foam. Because of its relatively low COF, preventing or at least minimizing relative movement between LDPE foam the object protected thereby has proven to be difficult, generally requiring extra packaging materials and labor than would otherwise be required if the COF of the foam was higher.

A similar application wherein a higher COF would be desired is the use of LDPE foam for a tool box liner, i.e., a cushion upon which tools may be placed in a tool box to protect both the tools and the tool box, and also to decrease the noise generated when the tool box is moved or otherwise handled. Tool boxes often have individual drawers that are pulled out to provide access to a desired tool. Such movement places a lateral force on the tools at the point at which the tools rest on the surface of the base of the drawer. Absent sufficient frictional force between the tools and the drawer, the tools have a tendency to slide relative to the drawer surface towards the rear of the drawer, thereby accumulating in a disorderly jumble at the rear of the drawer. As can be appreciated, this situation makes it more difficult to locate the intended tool than if the tools were neatly arrayed on the base of the drawer. Similar tool movement can also occur during movement or other handling of the tool box.

Another property of LDPE foam that is undesirable for certain applications is its relative stiffness or hardness. This becomes a factor when the foam is used to make functional apparel, including floatation devices such as life jackets, or padding for sporting goods such as football, baseball, and hockey equipment. In such applications, a softer foam is desirable because a flotation device or piece of sporting equipment made from a softer foam is more comfortable to the person wearing the article than is a similar article made from a harder foam.

Accordingly, a need exists in the art for an improved foam that overcomes the foregoing disadvantages.

SUMMARY OF THE INVENTION

The inventors have discovered that foams made from certain ethylene/vinyl acetate copolymers provide beneficially higher COF and greater softness than foams made from LDPE.

Such foams in accordance with the present invention comprise ethylene/vinyl acetate copolymer having a melt index of greater than 1 gram/10 minutes and a vinyl acetate content ranging from about 5 to about 25 weight percent, based on the total weight of the ethylene/vinyl acetate copolymer.

Another aspect of the invention pertains to a method of making a foam, comprising:

a. forming a polymer melt comprising ethylene/vinyl acetate copolymer having a melt index of greater than 1 gram/10 minutes and a vinyl acetate content ranging from about 5 to about 25 weight percent, based on the total weight of the copolymer;

b. adding a blowing agent to the polymer melt; and c. causing the blowing agent to expand within the melt, thereby forming a foam.

DETAILED DESCRIPTION OF THE INVENTION

Useful ethylene/vinyl acetate copolymers (EVA) in accordance with the present invention have a melt index of greater than 1 gram/10 minutes; more preferably greater than 1.5 g/10 min. EVAs in accordance with the invention also have a vinyl acetate content ranging from about 5 to about 25 weight percent, based on the total weight of the EVA copolymer; more preferably, the vinyl acetate content ranges from about 6 to about 20 wt. %.

The inventors found that the foregoing EVAs may be advantageously employed to make foams that overcome the above-described disadvantages of LDPE.

With respect to the vinyl acetate (VA) content of the EVA, it was discovered that if the VA content is below about 5 wt. %, the COF of foam made from such EVA is not significantly improved over foam made from LDPE. However, when EVA with a VA content greater than 5 wt. % is employed, a substantial improvement in COF results (see Example 1).

The improvement in COF was found to be even more significant when the melt index (MI) of the EVA is greater than 1 (also shown in Example 1).

Preferably, the EVA foam has a coefficient of friction of greater than about 0.45, as measured at a surface of the foam in accordance with ASTM D1894 and described more fully below in Example 1. More preferably, the COF of the foam is greater than about 0.5, such as between about 0.5 and 0.7. Foams having such COF values have been determined to provide a beneficial increase in protective packaging performance because they have a reduced tendency to slide against the surface of the object to be packaged in comparison to LDPE and other foams having a lower COF.

In addition to increasing the COF of the foam, it was found that EVA having a VA content above 5 wt. % also results in foam having improved softness in comparison to foams made from EVA with less than 5 wt. % VA content (see Example 1). This property is particularly beneficial for floatation devices and sporting equipment. When used in such applications, it is preferred that the foam has a hardness of less than 28, as measured in accordance with ASTM F1957-99.

The inventors further discovered, on the other hand, that when the VA content of EVA foam is greater than about 25%, the foam quality and density is very poor (see Example 2), rendering such foam commercially unacceptable.

In addition to having an effect on COF, the MI of the EVA also has a considerable effect on foam quality and on the through-put capability of the extrusion equipment used to make the foam. Specifically, EVA with a MI above 1 g/10 min. is highly preferred over EVA having a MI below 1 in that both foam quality and through-put capability are superior with foams made with EVA having a MI greater than 1 vs. those made from EVA having a MI below 1 (see Example 3).

Suitable procedures for determining MI, hardness, and COF are described below in Example 1.

If desired, ethylene homopolymer, such as LDPE, or ethylene/alpha-olefin copolymer may be blended with EVA. It has been determined that foam softness may be further increased (i.e., hardness decreased) by blending the ethylene homopolymer or ethylene/alpha-olefin copolymer in an amount ranging from about 20 to about 70 weight percent, with the balance being EVA. (See Example 4).

Preferably, foams in accordance with the present invention have a density ranging from about 0.5 to about 15 pounds/ft$^3$. More preferably, the density ranges from about 1.5 to about 10 pounds/ft$^3$. The foam may be in the form of a sheet or plank having a thickness ranging from about 0.015 to about 5 inches; more preferably, from about 0.06 to about 3 inches; most preferably from about 0.09 to about 2.25 inches.

In producing the foam sheets described herein, any conventional chemical or physical blowing agents may be used. Preferably, the blowing agent is a physical blowing agent such as carbon dioxide, ethane, propane, n-butane, isobutane, pentane, hexane, butadiene, acetone, methylene chloride, any of the chlorofluorocarbons, hydrochlorofluorocarbons, or hydrofluorocarbons, as well as mixtures of the foregoing.

The blowing agent may be mixed with the EVA polymer resin in any desired amount to achieve a desired degree of expansion in the resultant foam. Generally, the blowing agent may be added to the polymer resin in an amount ranging from about 0.5 to 80 parts by weight, based on 100 parts by weight of the polymer. More preferably, the blowing agent is present at an amount ranging from 1 to 30 and, most preferably, from 3 to 15 parts per 100 parts by weight of the polymer.

If desired or necessary, various additives may also be included with the polymer. For example, it may be desirable to include a nucleating agent (e.g., zinc oxide, zirconium oxide, silica, talc, etc.) and/or an aging modifier (e.g., a fatty acid ester, a fatty acid amide, a hydroxyl amide, etc.). Other additives that may be included if desired are pigments, colorants, fillers, antioxidants, flame retardants, stabilizers, fragrances, odor masking agents, and the like.

Foam in accordance with the present invention is preferably made by an extrusion process that is well known in the art. In such a process, the EVA and any additional polymers, e.g., LDPE, are added to an extruder, preferably in the form of resin pellets. Any conventional type of extruder may be used, e.g., single screw, double screw, and/or tandem extruders. In the extruder, the resin pellets are melted and mixed.

It was unexpectedly found that a melt temperature of less than about 195° F. produces superior foams when using EVA having a VA content ranging from about 10 to about 25 wt. %. Above 195° F., the extrudate was found to exhibit severe cell collapse with little or no expansion into a foam. Accordingly, during the foam extrusion process, the EVA polymer melt is preferably maintained at a temperature of less than 195° F. This is described in more detail in Example 6.

On the other hand, when using EVA having a VA content ranging from about 5 to about 10 wt. %, it was determined that the polymer melt may be maintained at a higher temperature, but preferably no higher that about 230° F.

A blowing agent is preferably added to the melted polymer via one or more injection ports in the extruder. Any additives that are used may be added to the melted polymer in the extruder and/or may be added with the resin pellets. The extruder pushes the entire melt mixture (melted polymer, blowing agent, and any additives) through a die at the end of the extruder and into a region of reduced temperature and pressure (relative to the temperature and pressure within the extruder). Typically, the region of reduced temperature and pressure is the ambient atmosphere. The sudden reduction in pressure causes the blowing agent to nucleate and expand into a plurality of cells that solidify upon cooling of the polymer mass (due to the reduction in temperature), thereby trapping the blowing agent within the cells.

Preferred foams in accordance with the present invention are not cross-linked, i.e., have substantially no cross-linked bonds between adjacent polymer chains and have little or no detectable gel content, e.g., less than 1% gel content. Thus, the number average molecular weight of the foam is preferably below 300,000. Non-crosslinked foams are advantageous because they are much easier to recycle than cross-linked foams, less expensive to manufacture, and free from undesirable odors, which generally accompany cross-linked foams. On the other hand, the EVA foams in accordance with the present invention provide the increased softness heretofore attributed to cross-linked foams.

The foregoing, as well as other, aspects and advantages of the invention may be further understood by reference to the following examples, which are provided for illustrative purposes only and are not intended in any way to be limiting.

EXAMPLES

Table 1 provides a description of the ethylene/vinyl acetate copolymer (EVA) resins that were used in the Examples, which were purchased from ExxonMobil Chemical, except for ELVAX 3128, which was purchased from DuPont.

TABLE 1

| Resin, ExxonMobil Designation | Melt Index (MI), g/10 min | Density, g/cc | Vinyl Acetate (VA) content, Wt. % |
| --- | --- | --- | --- |
| EVA, LD 312 | 1.0 | 0.925 | 4.6 |
| EVA, LD 307 | 2.0 | 0.924 | 5 |
| EVA, ELVAX 3128 | 2.0 | 0.930 | 8.9 |
| EVA, LD 725 | 2.1 | 0.939 | 18 |
| EVA, LD 728 | 2.0 | 0.940 | 19 |
| EVA, LD 730 | 0.7 | 0.939 | 18 |
| EVA, LD 768 | 2.3 | 0.950 | 27.5 |

Example 1

EVA foam sheets of approximately ⅛ inch thickness were produced using a twin screw extruder with an annular orifice and then tested. The results are summarized in Table 2.

TABLE 2

| Foam Sample | Resin | % VA | MI | Foam Density, pcf | Hardness | COF |
|---|---|---|---|---|---|---|
| Sample A (Comparative) | EVA, LD 312 | 4.6 | 1.0 | 2.79 | 38.5 | 0.444 |
| Sample B (Comparative) | EVA, LD 730 | 18 | 0.7 | 1.63 | 25.0 | 0.57 |
| Sample 1 | EVA, ELVAX 3128 | 8.9 | 2.0 | 1.33 | 27.3 | 0.634 |
| Sample 2 | EVA, LD 725 | 18 | 2.1 | 1.16 | 27.6 | 0.69 |

For Sample 1, 1.2 wt. % talc and 1.4 wt. % aging modifier (glycerol monostearate) were blended with the EVA, along with 13.6 wt. % propane blowing agent. For Comparative Sample A and Sample 2, 0.7 wt. % talc and 1.5 wt. % aging modifier (glycerol monostearate) were blended with the EVA, along with 14 wt. % isobutane blowing agent. For Comparative Sample B, 1 wt. % talc and 1.2 wt. % aging modifier (glycerol monostearate) were blended with the EVA, along with 13.3 wt. % propane blowing agent.

Melt Index (MI) is measured in accordance with ASTM D1238 by loading the resin into a cylinder and placing a 2.16 kilogram weight thereon while maintaining the temperature of the resin at 190° C. The material is allowed to flow through an orifice at the bottom of the cylinder. The total amount of extrudate that flows through the die in 10 minutes time is weighed and melt index values are calculated in grams per 10 minutes.

Hardness may be measured using a type CF Durometer (e.g., a Model 414 CF Durometer manufactured by PTC Instruments) in accordance with ASTM F1957-99. The hardness values reported herein were obtained from a slightly modified ASTM F1957-99 procedure by first preparing test specimens by cutting the foam samples into 4"×4" pieces and stacking them on each other to a thickness of about 0.5 inch (instead of the 1" thickness specified in ASTM F1957-99). The CF Durometer, having a 0.5 inch indenter, was then used to measure foam hardness by pressing the indenter into the foam in the thickness direction. The Durometer measures the hardness of the foam and assigns a value ranging from 0 to 100, with higher numbers indicating harder foams. The reported hardness values are the arithmetic mean for three such measurements on each test specimen.

Coefficient of Friction (COF) testing was determined in accordance with ASTM D1894, except that an aluminum sled, which was pulled at 5 inches/minute across the surface of the sample, weighed 155 grams instead of the 200 gram weight as specified in the ASTM test. The COF tests were carried out at 51% relative humidity and 72° F. Each reported COF value is the average kinetic COF obtained from 5 separate measurements on each sample.

As indicated by the results set forth in Table 2, foams made from EVA having a VA content greater than 5% exhibit less hardness, i.e., are softer, than comparable foams made from EVA having a lower VA content. Such increased softness is highly beneficial, particularly when foams are employed in various floatation and sporting equipment applications.

The results shown in Table 2 further indicate that foams made from EVA having a VA content greater than 5% also have a higher COF. Surprisingly, the COF was further increased by using an EVA having a MI of greater than 1 (Samples 1 and 2) vs. an EVA with a MI of 0.7 (Comparative Sample B).

Example 2

Extruded EVA foam strands of approximately 0.5" in diameter were produced using a Haake extruder having a capillary die with a round, 3 mm diameter orifice. In addition to EVA, 2 wt. % talc (in an LDPE carrier) and 1.5 wt. % aging modifier (blend of stearyl monoethanolamide and glycerol monostearate) were added. Approximately 13 wt. % isobutane was employed as the blowing agent. The results are summarized in Table 3.

TABLE 3

| Foam Sample | Resin | VA Content, Wt. % | Foam Density, pcf | Results |
|---|---|---|---|---|
| Sample C (Comparative) | EVA, LD 307 | 5 | 1.74 | Good Foam |
| Sample 3 | EVA, LD 725 | 18 | 1.71 | Good Foam |
| Sample D (Comparative) | EVA, LD 768 | 27.5 | 37.25 | Poor foam expansion due to pre-foaming in the die; resulted in severe foam collapse at the die exit and high degree of surface roughness. |

This example demonstrates the effect that VA content has on the quality of EVA foam. A relatively low VA content, i.e., below about 25 wt. %, produced foam of good quality (Comparative Sample C and Sample 3). In contrast, when EVA having a VA content above about 25 wt. % was used (Comparative Sample D), the foam quality diminished in dramatic fashion, accompanied by major and detrimental increase in density. As a result, the foam of Comparative Sample D would be unacceptable for commercial packaging or functional apparel applications.

Example 3

Extruded EVA foam strands were produced using a Haake extruder having a capillary die with a round, 3 mm diameter orifice. In addition to EVA, 2 wt. % talc (in LDPE carrier) and 1.5 wt. % aging modifier (blend of stearyl monoethanolamide and glycerol monostearate) were added. Approximately 17.7 wt. % of isobutane was added as blowing agent.

The results are summarized in Table 4.

TABLE 4

| Foam Sample | Resin | MI, g/10 min. | % VA content | Motor Amperes (N-m) | Foam Density, pcf | Die Pressure, psi |
|---|---|---|---|---|---|---|
| Sample 4 | EVA, LD 725 | 2.0 | 18 | 28.52 | 1.33 | 838 |
| Sample E (Comp.) | EVA, LD 730 | 0.7 | 18 | 35.20 | 1.28 | 980 |

As this example demonstrates, the EVA used in Comparative Sample E, having a MI of 0.7, required 23% more power to make foam than the EVA in Sample 4, having a MI of 2.0. This is significant because, for a given foam extruder, a lower energy requirement means that more foam can be processed through the extruder. Thus, EVAs having a MI above about 1 are advantageous because such EVAs provide a higher foam output rate than EVAs having a MI below 1.

Additionally, the lower MI EVA of Sample E generated higher pressure in the die (17% higher) than the higher MI EVA of Sample 4. The higher die pressure produced a higher degree of shear heat in the die which, in turn, resulted in the foam of Sample E having an undesirable roughened surface in comparison with the foam of Sample 4.

Example 4

In this example, LD 725 EVA (18% VA and 2.1 MI) was blended with 50 wt. % LDPE (Sample 5) and 75 wt. % LDPE (Sample 6), and the resultant foams were compared with foam made from 100% LD 725 EVA (Sample 2, as described above). The foams were foam sheets of approximately ⅛ inch thickness, and were produced using a twin screw extruder with an annular orifice. For Samples 5 and 6, 2 wt. % aging modifier (glycerol monostearate) was blended with the EVA, along with 16 wt. % isobutane blowing agent.

The sheets were then evaluated. The results are summarized in Table 5.

TABLE 5

| Foam Sample | Resin(s) | Foam Density, pcf | Hardness* | Static COF* (Machine Direction) |
|---|---|---|---|---|
| Sample 2 | 100% EVA | 1.16 | 27.6 | 0.69 |
| Sample 5 | 50% EVA/50% LDPE | 1.16 | 25.6 | 0.37 |
| Sample 6 | 25% EVA/75% LDPE | 1.16 | 30.6 | 0.34 |

*Measured as described above

Blending about 50% LDPE with EVA resulted in a foam with less hardness (i.e., increased softness) in comparison with 100% EVA foam, albeit at the expense of a decrease in COF. This is beneficial for sporting and floatation applications, where high COF is a relatively unimportant feature but softness is a relatively important feature. Interestingly, when the amount of LDPE in the blend was increased to 75%, the foam hardness actually increased as compared to 100% EVA foam. Thus, for purposes of blending LDPE to reduce hardness, it is preferred to include not more than about 70 wt. % LDPE with the EVA.

Example 5

Foam sheets comprising LDPE and EVA were prepared as described above, with a resin rate of 250 lbs./hr, to which was blended 15 wt. % isobutane, 1.2 wt. % glycerol monostearate, and 0.7 wt. % talc. The sheets were tested and the results are summarized in Tables 6 and 7.

TABLE 6

| Foam Sample | Resin | Melt Temp., °F. | Thickness, mm | Density, kg/m$^3$ | Impact energy*, ft-lb |
|---|---|---|---|---|---|
| F (Comp.) | LDPE | 230 | 6.9 | 17.6 | 1.96 |
| G (Comp.) | LDPE | 232 | 3.3 | 19.2 | 0.79 |
| 7 | EVA, LD 728 | 189 | 6.86 | 20.8 | 4.37 |
| H (Comp.) | EVA, LD 312 | 196 | 0.79 | 149 | 1.96 |

*ASTM D4272

TABLE 7

| | Sample F (LDPE) | Sample 7 (EVA) |
|---|---|---|
| Thickness, mm | 6.9 | 6.86 |
| Density, kg/m$^3$ | 17.6 | 20.8 |
| Tear propagation*, gm/ply | | |
| MD | 192 | 448 |
| CMD | 432 | 960 |
| Tear Resistance**, lb/in | | |
| MD | 5.4 | 9.2 |
| CMD | 8.3 | 11.4 |

*ASTM D1922
**ASTM D3575-91, Suffix G

As indicated by the data presented in Tables 6 and 7, EVA foam in accordance with the present invention exhibits superior properties in comparison to other foams made from 1) EVA with a low VA content (Comparative Sample H) and 2) LDPE (Comparative Samples F and G).

Example 6

In this example, various foam sheets were made from LD 725 EVA resin, having a VA content of 18%, to determine the effect of melt temperature on the quality of the foam sheet. For each foam sheet, 8.3 wt. % propane blowing agent was mixed with the LD 725 EVA, along with 1.2 wt % aging modifier (glycerol monostearate). The foam was extruded at a rate of 242 lbs/hr. For each sheet, the density of the sheet was measured both immediately after extrusion and cooling ("fresh foam") and after 11 days aging time. The results are summarized in Table 8.

TABLE 8

| Foam Sample | Melt Temperature, °F. | Foam Density, pcf: Fresh Foam | Foam Density, pcf: 11 days Aged Foam |
|---|---|---|---|
| 8 | 189 | 2.11 | 1.78 |
| 9 | 190 | 2.88 | 2.15 |
| 10 | 191 | 3.06 | 2.81 |
| 11 | 192 | 3.43 | 2.73 |
| 12 | 195 | 13.48 | 11.92 |
| 13 | 199 | 18.78 | 18.1 |
| 14 | 202 | 18.28 | 18.66 |
| 15 | 207 | 17.97 | 19.94 |
| 16 | 211 | 21.09 | 21.4 |
| 17 | 225 | 20.84 | 22.21 |

As shown, for both the fresh foam and aged foam, the density of the foam increased dramatically when the melt temperature was at 195° F. and above. By "melt temperature," it is meant the temperature of the polymer melt, i.e., molten mixture of EVA resin, blowing agent, and additives, as measured in the die, which is positioned just downstream of the extruder. The sharp increase in density is a quantitative indication of a severe collapse of the cells of the foam, and therefore of very poor foam quality, which more closely resembled a non-foamed polymeric mass than a foam. For example, the density increased by more than 300% when comparing the foam of sample 11 to the foam of sample 12.

In contrast, when the melt temperature was below 195° F. (Samples 8–11), the foam density was within a desirable range of 5 pcf or less. In addition, the foam quality was excellent, as shown by a decrease in foam density after aging for 11 days, which indicates post-extrusion expansion rather than collapse.

Accordingly, when making EVA foams having a VA content of about 10% to about 25%, the polymer melt is preferably maintained at a temperature of less than 195° F. On the other hand, when using EVA with a VA content of about 5% to about 10%, it was found that a maximum melt temperature of about 230° F. may be employed.

While the invention has been described with reference to illustrative examples, those skilled in the art will understand that various modifications may be made to the invention as described without departing from the scope of the claims which follow.

What is claimed is:

1. A foam sheet or plank, comprising:
   a. ethylene/vinyl acetate copolymer having a melt index of greater than 1 gram/10 minutes and a vinyl acetate content ranging from about 5 to about 25 weight percent, based on the total weight of said copolymer; and
   b. glycerol monostearate,
   wherein, said foam sheet or plank has a thickness ranging from about 0.015 to about 5 inches.

2. The foam of claim 1, wherein said foam further comprises a blend of said ethylene/vinyl acetate copolymer with ethylene homopolymer or ethylene/alpha-olefin copolymer.

3. The foam of claim 2, wherein said ethylene homopolymer or ethylene/alpha-olefin copolymer is present in said blend in an amount ranging from about 20 to about 70 weight percent, based on the total weight of said ethylene/vinyl acetate copolymer and ethylene homopolymer or ethylene/alpha-olefin copolymer in said blend.

4. The foam of claim 1, wherein said foam has a density ranging from about 0.5 to about 15 pounds/ft$^3$.

5. The foam of claim 1, wherein said foam comprises a plurality of cells containing therein at least one physical blowing agent.

6. The foam of claim 1, wherein said foam has a coefficient of friction of greater than about 0.45, as measured at a surface of said foam.

7. The foam of claim 1, wherein said foam has a hardness of less than 28.

8. The foam of claim 1, wherein said foam has substantially no cross-linked bonds between adjacent polymer chains.

9. A method of making a foam sheet or plank, comprising:
   a. forming a polymer melt comprising ethylene/vinyl acetate copolymer having a melt index of greater than 1 gram/10 minutes and a vinyl acetate content ranging from about 5 to about 25 weight percent, based on the total weight of said copolymer;
   b. adding a blowing agent and glycerol monostearate to said polymer melt; and
   c. causing said blowing agent to expand within said melt, thereby forming a foam sheet or plank having a thickness ranging from about 0.015 to about 5 inches.

10. The method of claim 9, wherein said step of causing said blowing agent to expand is accomplished by extruding said polymer melt and blowing agent through a die and into a region of reduced pressure.

11. The method of claim 9, wherein said method further comprises blending ethylene homopolymer or ethylene/alpha-olefin copolymer with said ethylene/vinyl acetate copolymer in said polymer melt.

12. The method of claim 11, wherein said ethylene homopolymer or ethylene/alpha-olefin copolymer is blended in an amount ranging from about 20 to about 70 weight percent, based on the total weight of said ethylene/vinyl acetate copolymer and ethylene homopolymer or ethylene/alpha-olefin copolymer in said polymer melt.

13. The method of claim 9, wherein sufficient blowing agent is added to said polymer melt a foam having a density ranging from about 0.5 to about 15 pounds/ft$^3$.

14. The method of claim 9, wherein said blowing agent comprises at least one physical blowing agent.

15. The method of claim 9, wherein
   a. said ethylene/vinyl acetate copolymer has a vinyl acetate content ranging from about 10 to about 25 weight percent, and
   b. said polymer melt is maintained at a temperature of less than 195° F.

16. The method of claim 9, wherein
   a. said ethylene/vinyl acetate copolymer has a vinyl acetate content ranging from about 5 to about 10 weight percent, and
   b. said polymer melt is maintained at a temperature of less than 230° F.

* * * * *